Aug. 1, 1939.  F. V. BORDEN  2,167,935
CLUTCH OR BRAKE BAND
Filed Aug. 8, 1938

INVENTOR
Forrest V. Borden
BY
ATTORNEY

Patented Aug. 1, 1939

2,167,935

UNITED STATES PATENT OFFICE 2,167,935

CLUTCH OR BRAKE BAND

Forrest V. Borden, San Luis Obispo, Calif.

Application August 8, 1938, Serial No. 223,595

3 Claims. (Cl. 188—78)

My invention relates to a clutch or brake that is adapted to connect mechanical elements for rotation together or to check or control rotation of such elements by frictional pressure exerted by the outward movement or expansion of the clutch or brake against the inner periphery of a drum or other element.

Specifically, the invention relates to a clutch or brake band that is operated expansively to cause the braking or clutching force to be applied.

In actual practice, I have found that in nearly all internal clutches or brake bands, the lining tears off at the dead or fixed end or wears down at that point exceedingly quickly under the friction so that the metal band, being exposed, scores, and thereby injures the brake drum.

The prime objects of the present invention, therefore, are to provide a brake or clutch band in which this tearing or damage is obviated; in which the life of the brake lining is considerably prolonged and in which the efficiency of the brakiing or clutching action is increased.

Figure 1:
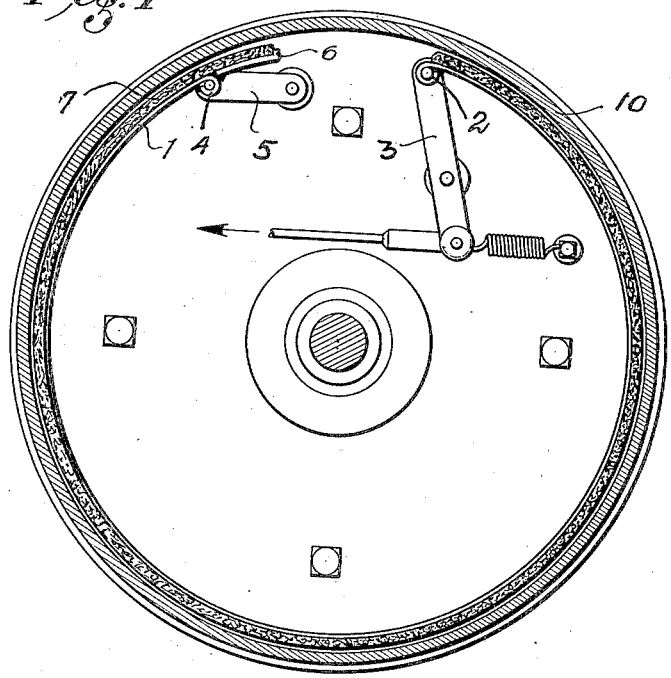
Figure 2:
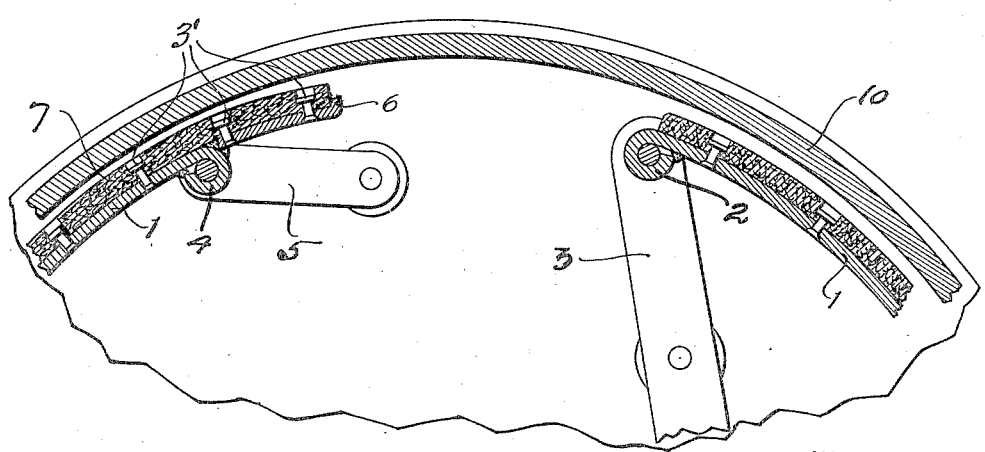

The accompanying drawing illustrates the invention, and therein Fig. 1 is a side view illustrating my invention and Fig. 2 is an enlarged fragmentary sectional view.

The brake band 1 is circular and of metal and is provided at the live or operating end with an apertured lug 2 for a lever 3 which is usually connected with mechanism by which the band is expanded against a drum 10. This mechanism forms no part of this invention and is therefore neither shown nor described.

Near the terminus of the other end, said band 1 is provided with an apertured lug on the underside for pivoting a link 5 by which said end is fixedly secured, as usual in practice. The band 1 projects beyond said lug 4 a short distance and the extreme end thereof is provided with an abutment 6 for the end of a lining 7 that is secured by rivets to the outer periphery of the band. The abutment 6 is preferably provided by upturning the end of the band a distance less than the thickness of the lining. It provides a secure means for preventing creeping or any movement of the lining, and obviously the extension of the band beyond the lug 4, increases the area or extent of the lining, especially at that point where, in this type of brakes or clutches the pressure and friction, and hence the wear is greatest. The part of the band which projects beyond the lugs is desirably inwardly directed preferably to an extent equal to or slightly greater than the height of the abutment 6, so that the top of the abutment is substantially in line with the outer periphery of the band body. In this wise the abutment remains free from the drum 10 when the brake lining has worn thin or disappeared.

What I claim is:

1. A device of the character disclosed comprising a circular split band provided on the underside with means for securing one end of said band, said band having an inflexible extension projecting beyond said securing means and said extension having a stop and being inwardly curved at the end thereof to an extent substantially equal to the height of said stop, and a lining secured to said band and extension and abutting against said stop.

2. A device of the character disclosed comprising a circular band provided at one end with an operating lever and near the other end with a lug for securing said band, the band projecting beyond and over said lug and being provided with an abutment at the end thereof, said projecting portion of the band being inwardly directed, and a lining fastened to the outer surface of said band and at its one end bearing against said abutment.

3. A device of the character disclosed comprising a circular band provided with an abutment at the extreme end thereof, and a portion of the end of said band being inwardly directed to an extent substantially equal to the height of said abutment, a lining secured to the outer periphery of said band and adjacent to said abutment at one end, the lining being greater in thickness than the height of the abutment, a lug on the underside of said band and rearwardly of the end thereof to secure same and an operating lever on the other end of said band.

FORREST V. BORDEN.